United States Patent [19]
Wood et al.

[11] Patent Number: 5,577,864
[45] Date of Patent: Nov. 26, 1996

[54] APPARATUS RELATING TO THE LININGS OF PIPELINES AND PASSAGEWAYS

[75] Inventors: Eric Wood, deceased, late of Castletown; Miranda J. Bull, executrix, Peel, both of Isle of Man

[73] Assignee: Insituform B.V., Netherlands

[21] Appl. No.: 256,165

[22] PCT Filed: Dec. 10, 1992

[86] PCT No.: PCT/GB92/02287

§ 371 Date: Jun. 23, 1994

§ 102(e) Date: Jun. 23, 1994

[87] PCT Pub. No.: WO93/13350

PCT Pub. Date: Aug. 5, 1993

[30] Foreign Application Priority Data

Dec. 23, 1991 [GB] United Kingdom ............ 9127315

[51] Int. Cl.$^6$ .................................................. E03F 3/06
[52] U.S. Cl. ............... 405/154; 405/157; 166/55; 409/143
[58] Field of Search ..................... 405/154, 157, 405/150.1; 166/55, 55.2, 55.6, 55.7; 409/143, 179

[56] References Cited

U.S. PATENT DOCUMENTS

| 4,197,908 | 4/1980 | Davis et al. | 166/55 |
| 4,442,891 | 4/1984 | Wood | 166/55.2 |
| 4,577,388 | 3/1986 | Wood | 166/55 X |
| 4,954,016 | 9/1990 | Storgard | 405/154 X |
| 4,986,314 | 1/1991 | Himmler | 409/143 X |
| 5,044,824 | 9/1991 | Long, Jr. et al. | 405/154 X |
| 5,150,989 | 9/1992 | Long, Jr. et al. | 405/154 X |
| 5,253,956 | 10/1993 | Fisco et al. | 405/154 |
| 5,318,395 | 6/1994 | Driver | 166/55.6 |

FOREIGN PATENT DOCUMENTS

| 0326412 | 8/1989 | European Pat. Off. . |
| 9011439U | 10/1990 | Germany . |
| 2147682 | 5/1985 | United Kingdom . |
| 2157796 | 10/1985 | United Kingdom . |
| WO90/15347A | 12/1990 | WIPO . |
| WO91/17325A | 11/1991 | WIPO . |

*Primary Examiner*—Frank Tsay
*Attorney, Agent, or Firm*—Cowan, Liebowitz & Latman; Michael I. Wolfson

[57] ABSTRACT

The invention provides that where a main underground pipeline or passageway (10) is lined by a lining tube which extends over the connection of a lateral pipe (12) with the main pipeline or passageway (10), the lateral connection can be readily located and the lining tube (44) cut to re-establish the connection, if such as a steel ball or other deposit, which is radiation detectable, is placed on the surface of the pipeline or passageway (10) at a predetermined distance (77) from the said lateral connection.

13 Claims, 4 Drawing Sheets

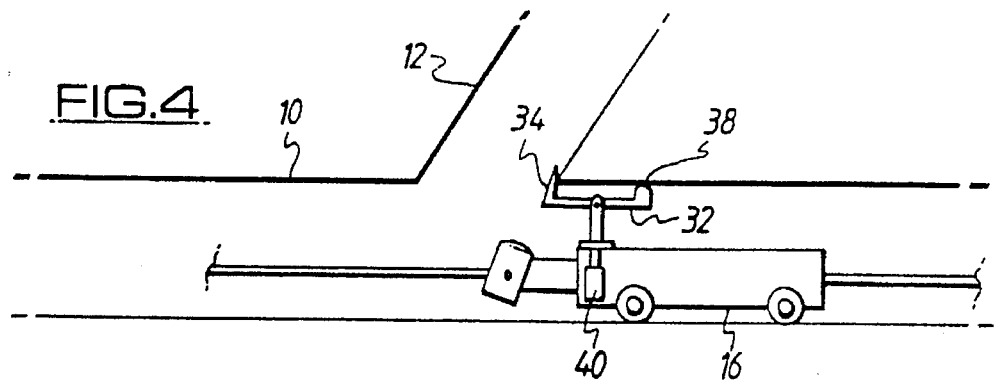
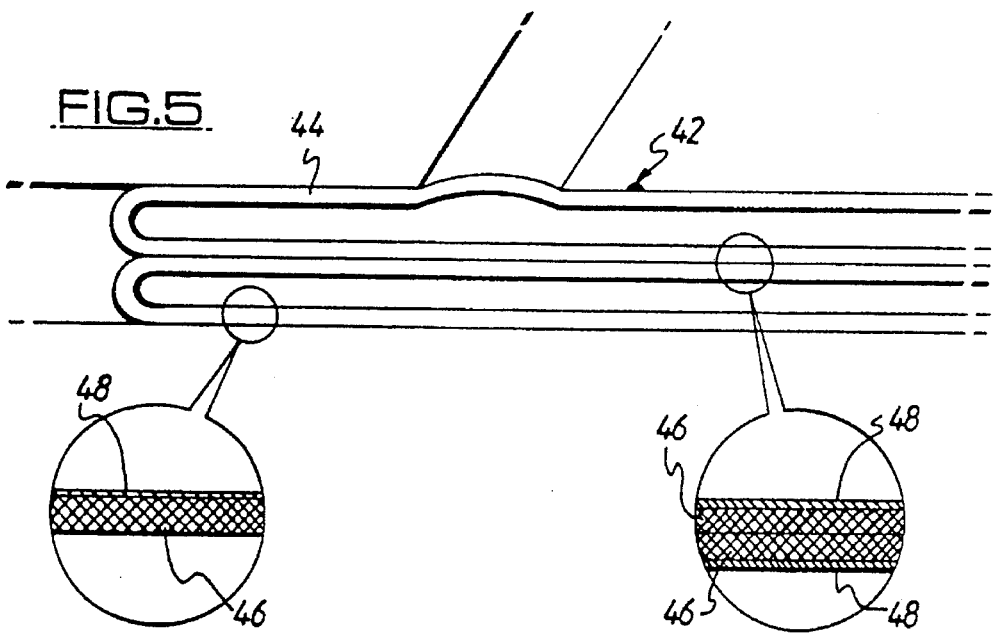
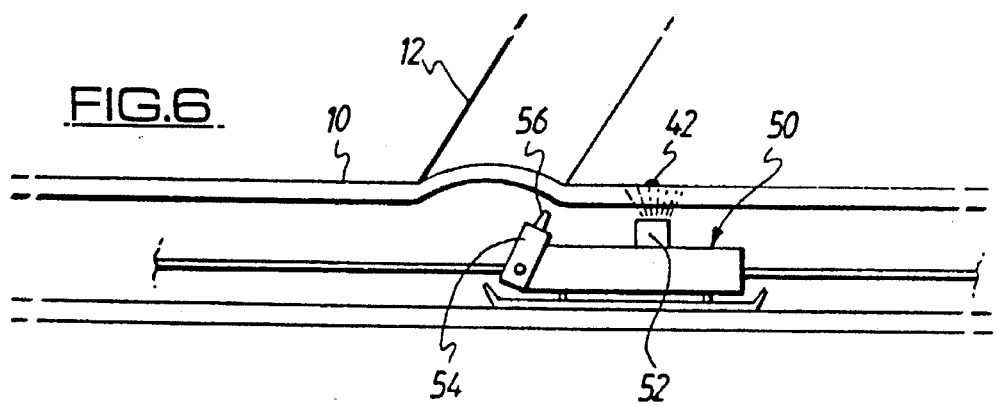

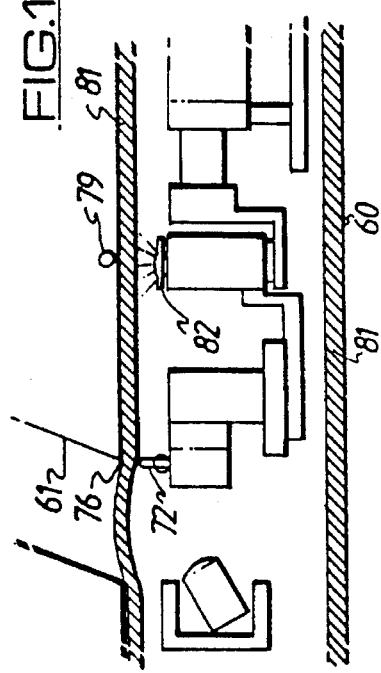
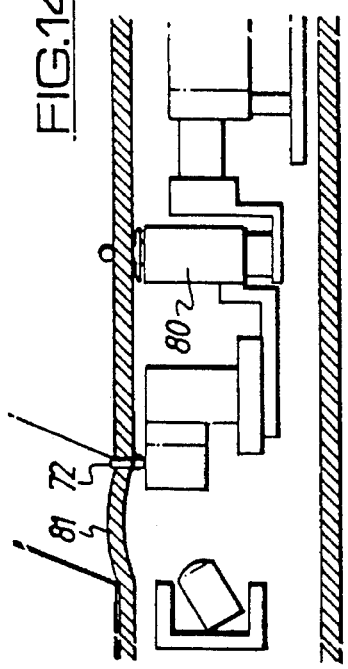
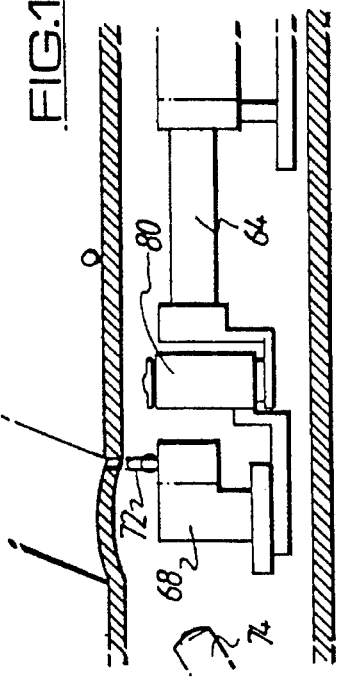
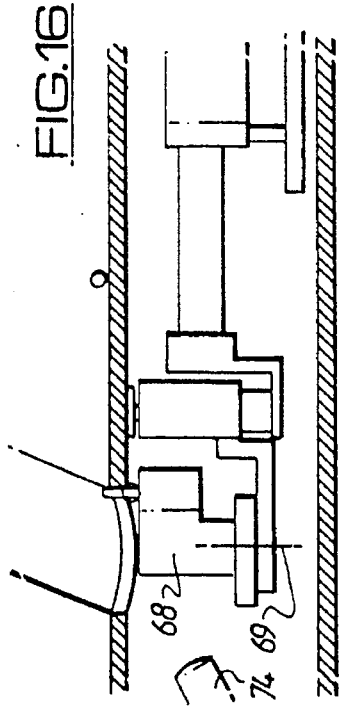
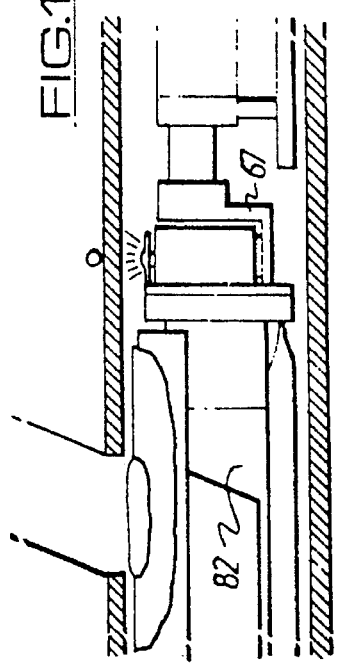
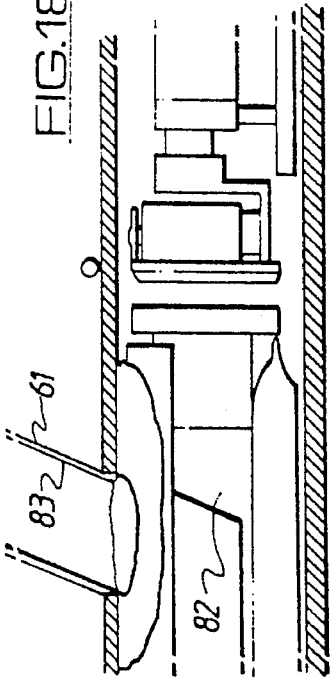

APPARATUS RELATING TO THE LININGS OF PIPELINES AND PASSAGEWAYS

BACKGROUND OF THE INVENTION

This invention relates to the lining of pipelines and passageways, wherein a lining tube is applied to the pipeline or passageway surface, and on completion of the lining operation remains in this position so as in effect to resurface the passageway. The lining may serve any of a number of functions, for example structurally to enhance the pipeline or passageway, to act as a barrier to liquid ingress or egress in relation to the passageway, to restore the flow characteristics of the passageway and to enhance the pipeline or passageway for carrying an alternative medium, for example to enable a pipeline or passageway to carry a corrosive medium where before its surface was unsuitable for carrying such medium. The lining may of course perform any combination of these functions and there may also be additional functions which it can perform.

Many, and probably the majority of these pipelines or passageways, have what are called lateral connections, being connections to spur or feeder pipes or passageways which branch from the main pipeline or passageway. In the case of a sewer the lateral connections typically are the individual waste pipe connections to individual homes and other buildings used by the public.

One of the problems concerned with the lining of underground pipelines or passageways which have lateral connections, is that when the lining is placed in position, it is not possible, beforehand, to make cut outs which will register with the lateral connections, and it is usual therefore for the lining tube to extend over the lateral connections, and subsequently to cut the tube at locations in register with the lateral connections to re-establish these connections. This cutting is done by placing in the lined pipeline or passageway a cutting device which is moved so as to register with the lateral connection, and to cut the lining to re-establish the lateral connection.

The difficulty which one experiences in the operation is the accurate placement of the cutting apparatus for the location of the lateral connection as it is covered by the lining. It is known to insert a T.V. camera to inspect the pipeline or passageway before lining takes place, to locate and record the positions of the lateral connections, and it is also known to transport an inspection camera through the pipeline or passageway after the lining operation in order visually to examine the lining, because if, as is frequently adopted, the lining is placed in position by the use of fluid pressure, and the lining is at least initially flexible, as it is urged into position, those portions of the lining in register with the lateral connections deflect into the laterals and so "dimples" are formed in the lining at the lateral connection locations. The camera can often see these "dimples" as distinct depressions which cast shadows. An operator at ground level with a T.V. monitor therefore is able to see the "dimple", and by appropriate controls which are to hand, he can manipulate the cutter to cut the lining and re-establish the lateral connection.

In practice this operation is very difficult. In the first place, using the method of pre-locating and recording the position of each lateral is not sufficiently accurate, so that often laterals cannot be re-located. In the post location of lateral connections frequently the dimples cannot be easily seen if as again frequently happens, the lining does not deflect to form the "dimples" referred to above, and the laterals may not be found after lining.

Obviously, and especially in the case of sewer pipes, if the laterals cannot be found and are not re-established, then serious problems will result. Although contractors who perform the lining operations and re-establishment of lateral connections do eventually succeed in performing contracts, there is considerable room for improvement in the aspect of the lining operation involving the accurate location of the lateral connections and the reliable re-establishment of these connections.

In the UK Patent Application No 2157796A it has been proposed that by means of a suitable apparatus, magnetically sensitive means is positioned on the pipeline or passageway before the lining operation, at a pre-determined distance from the lateral connection, and following the lining operation, means is inserted in the lined passageway by which the location of the deposit can be radiation sensed.

The magnetically sensitive means is a spot or blob of paint or paste applied to the pipeline or passageway surface which is applied by observation using a television camera. This can lead to difficulties insofar as conditions in a sewer are not always ideal for accurate working and it is desirable that the marking should be accurately placed in a simple and effective manner.

The present invention seeks to provide a simple but effective method and means for the said effective placement of said markings.

SUMMARY OF THE INVENTION

According to the invention there is provided a method of facilitating the locating of a lateral pipe which meets a main pipeline or passageway which has been lined with a lining tube which extends over the lateral pipe/main pipeline or passageway connection, wherein, by means of a suitable apparatus, radiation sensitive means is deposited on the main pipeline or passageway before the lining operation, at a pre-determined distance from the lateral connection, so that following the lining operation, means can be inserted in the lined main pipeline or passageway by which the location of the radiation sensitive means and hence the location of the lateral connection can be radiation sensed, characterised in that the radiation sensitive means is positioned on the main pipeline or passageway by locating the edge of the lateral connection using a mechanical feeler to establish a datum, and the radiation sensitive means (42, 79) is positioned by a positioning member (32) located at a pre-determined distance from the datum.

The radiation may be light radiation, magnetic, sonic, electric or any suitable form of radiation. If a light radiation which is preferred is adopted, such as to cause the radiation sensitive means to glow or fluoresce when a light radiation falls thereon, then the lining material will be required to be of a nature which is sufficiently transparent to enable the deposit to be eliminated and to glow or fluoresce as indicated.

Where the radiation is magnetic or electric, then a suitable sensor must be provided to indicate the detection of the radiation sensitive means. The radiation sensitive means may be a deposit of radiation sensitive material placed upon the pipeline or passageway surface by means of a pad, reservoir or the like. The deposit material may be liquid in nature provided with if necessary radiation detectable particles, and in one preferred arrangement, a deposit pad connected to that feeler by means of a lever arrangement so that when the feeler has detected the edge of the lateral connection, the lever is pivoted which causes the pad to be brought into deposit contact with the pipeline or passageway surface to make the deposit.

It is arranged that the distance between the feeler and the deposit is accurately known so that when subsequently a sensing device is placed in the pipeline or passageway after the lining operation, the edge of the lateral is also accurately known.

Subsequently therefore, when the cutting apparatus is inserted in the lateral, and the deposit is sensed for example by using light radiation, a cutter arranged at the pre-determined distance from the light sensor will be in the correct position to make the initial cut through the lining in the required position and the lateral connection. Once the cutter, which typically will be a drill, has entered the lateral at the required location, the subsequent cutting of the entire lateral by causing the cutter to move along the edge of the lateral connection is relatively simple.

Lateral connections do in fact meet main pipeline and passageways at differing angles, and one additional parameter which has to be established before satisfactory cutting can take place is the angle at which the lateral meets the main pipeline or passageway. This can be done by introducing a television camera into the pipeline or passageway before lining takes place, to locate the lateral, and to align the camera with the lateral axis.

This can be done for example by providing a graticule on the camera lens which is visible in the monitor at ground level. The operator positions the graticule so as to identify accurately a generatrix line on the lateral passageway which establishes the angle at which the lateral meets the main pipeline or passageway. The cutter in the subsequent cutting operation is set at this angle.

All required parameters of the lateral connection i.e. position and angle at which the lateral meets the pipeline or passageway are established, and subsequent remote control cutting can be performed accurately and easily.

In an alternative arrangement the radiation sensitive means is an element of rigid, metallic form. Specifically the element may be a small steel ball, and it may be placed in a hole drilled in the passageway or pipeline surface.

Where this arrangement is adopted, the said feeler may also comprise a drill bit and after the feeler has located the edge of the lateral connection, it is moved by said pre-determined distance and is used to drill said hole in the passageway surface.

Preferably, said positioning arm is arranged with said feeler on a rotary head at diametrically opposite positions equi-distant from the axis of rotation of the head, and the positioning arm inserts the element in said drilled hole after drilling of same and after rotating the head by 180 degrees.

Also according to the invention there is provided apparatus for facilitating the locating of a lateral pipe which meets a main pipeline or passageway which has been lined with a lining tube which extends over the lateral pipe/main pipeline or passageway connection, comprising means for depositing radiation sensitive means on the main pipeline or passageway before the lining operation, at a pre-determined distance from the lateral connection, so that following the lining operation, means inserted in the lined main pipeline or passageway can be used for the location of the radiation sensitive means and hence the location of the lateral connection can be radiation sensed, characterised by a mechanical feeler adapted to engage the edge of the lateral connection to establish a datum at a pre-determined distance from which along the main pipeline or passageway the radiation sensitive means can be located by a positioning member (32) located at said pre-determined distance from the datum.

The invention also extends to pipelines and passageways to which radiation sensitive means have been applied in accordance with the methods aforesaid and further to methods wherein the lining tube has been applied, the radiation sensitive means is located and the lining tube has been cut to re-establish the connection of the lateral pipe with the main pipeline or passageway.

BRIEF DESCRIPTION OF THE DRAWINGS

Embodiments of the present invention will now be described, by way of example, with reference to the accompanying diagrammatic drawings, wherein:

FIG. 3 and 4 show in views similar to FIG. 1, respective subsequent stages of the operation;

FIG. 5 shows the sewer and lateral of FIG. 1 during the process of the application thereto of the liner tube;

FIGS. 5A and 5B show respectively the ringed details indicated in FIG. 5;

FIG. 6 shows how the cutting apparatus is utilised to re-establish the lateral connection; and FIGS. 7 to 18 show, as a sequence of steps, a method according to another embodiment of the invention involving not only locating and re-establishing the lateral connection, but also lining of the lateral.

DESCRIPTION OF THE PREFERRED EMBODIMENTS

Figure 1:
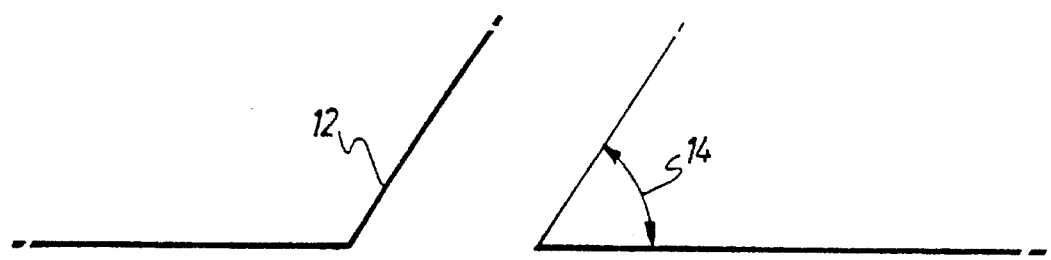
FIG. 1 is a side view showing a main underground sewer with a lateral connection thereto.

Referring to the drawings, and firstly to FIG. 1, an underground sewer (10) has a lateral passage (12) connecting therewith. The lateral meets the sewer (10) at the angle (14) as indicated.

The sewer (10) is to be lined with a flexible lining tube in the manner described in relation to FIG. 5, and the requirement is that the lateral connection of the pipe (12) to the sewer (10) has to be acurately ascertained as to its position along the sewer (10) before the lining is applied.

This is done in accordance with the embodiment of the invention as described with reference to FIGS. 2-4 which also show the sewer pipe (10) and the lateral connection (12).

Figure 2A:
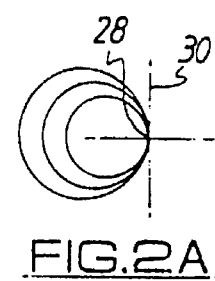
FIG. 2A shows a view as observed by the camera of the apparatus shown in FIG. 2 when the camera looks up the lateral connection.
Figure 2:
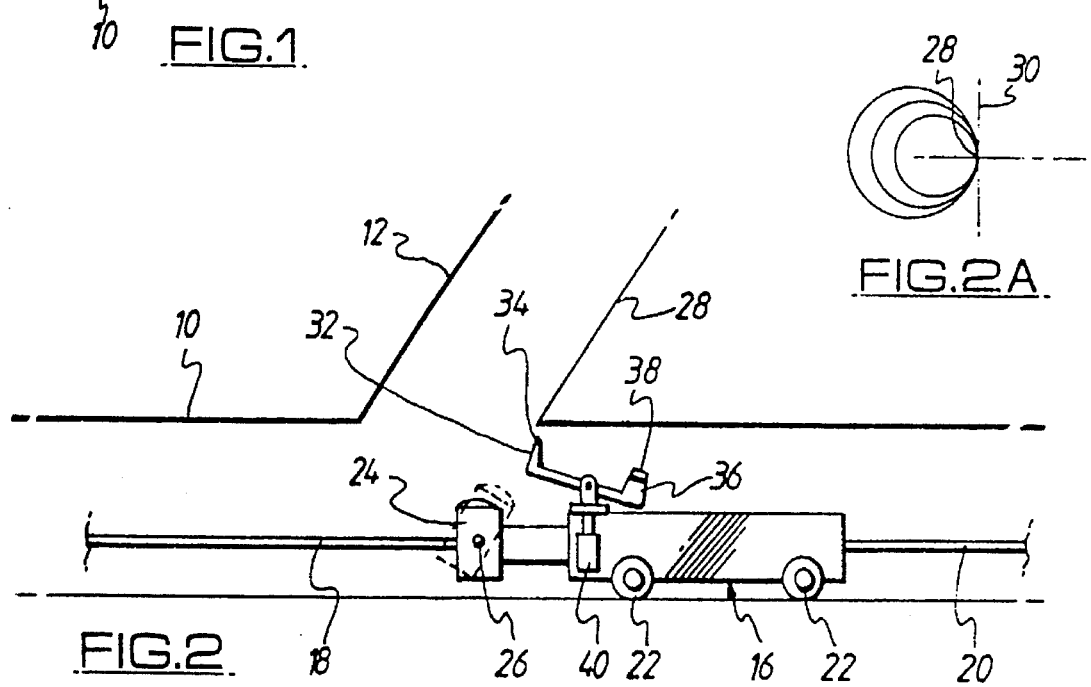
FIG. 2 shows the arrangement of FIG. 1 but after the placement therein of the apparatus to apply a radiation sensitive deposit.

As shown in FIG. 2, an apparatus (16) is pulled into and along the sewer (10) by means of cables or wires (18), (20) operated from the ground surface by suitable winches or the like.

The apparatus (16) is shown as being carried on wheels (22) (although skids could be used) and it is provided with an inspection T.V. camera (24) by which the interior of the sewer can be examined from ground level using a suitable monitor, the cables (18) and/or (20) providing the appropriate electrical connection. The camera (24) is adapted to be swivelled about the pivot (26) and also to be rotated about an axis extending longitudinally of the sewer (10) so that the camera can look at the lateral (12) and any other laterals whose positions are to be accurately ascertained.

From the ground level, the apparatus is manipulated and the camera swivelled and tamed until the camera looks up the lateral (12) along a generatrix line (28) in which position the camera sees the lateral (12) as indicated in FIG. 2A. A graticule (30) on the camera lens registers exactly tangentially with the lateral passage and lies on the said generatrix (28) so that the person operating the camera will know from appropriate read out equipment the exact angle (14) of the intersection of the lateral (12) with the passage (10).

When this angle has been ascertained, the operator now manipulates another portion of the apparatus comprising a swinging lever (32) which is provided with a feeler (34) and an applicator pad portion (36 ) carrying a pad or reservoir (38) of radiation sensitive material.

The lever (32) is carried by means of an expansion device (40) which may be a small fluid pressure operated jack or a screw jack driven by a small electric motor. Using the camera (24) the operator manipulates the apparatus until the feeler (34) upon expansion of the jack (40) can enter the lateral (12) as shown in FIG. 3. At this time the lever is biased as shown in FIGS. 2 and 3 so that the pad (38) does not come into contact with the surface of the passage (10).

Figure 3:
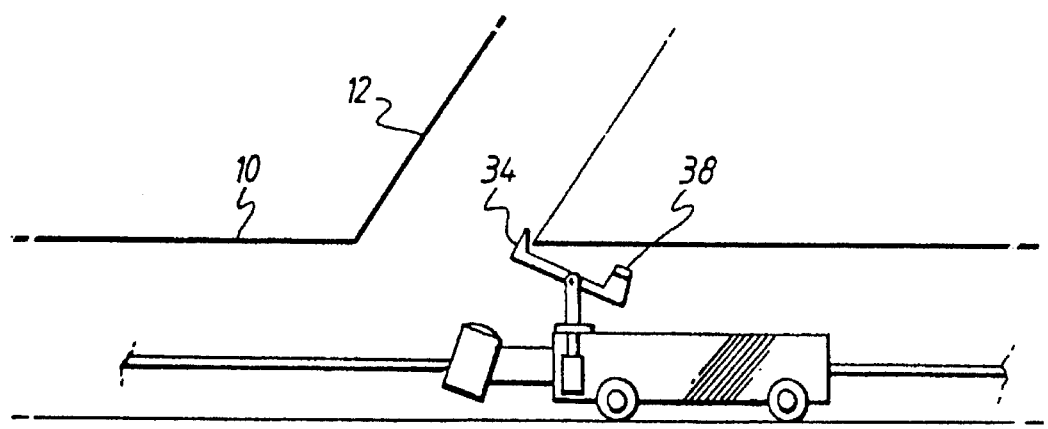

When the operator has successfully positioned the feeler (34) in the position shown, the apparatus is pulled gently to the right in FIG. 3 until the position indicated in FIG. 4 is reached in which position the engagement of the feeler (34 ) with the edge of the lateral connection causes the lever (32) to pivot anti clockwise bringing the pad (38) into firm contact with the passageway surface and thereby leaving a deposit of the radiation sensitive material on the passageway surface. The deposit is indicated by reference (42) in FIG. 5. When this deposit has been made, the jack (40) is retracted and the apparatus (16) is removed from the pipeline or passageway leaving the radiation sensitive spot (42) in position.

As the length of the lever (32) is accurately known as is the distance between the feeler (34) and the pad (38), the spot (42) is accurately positioned a predetermined distance from the edge of the lateral connection and location of that spot amounts to location of the lateral.

The passageway may then be lined by the method indicated generally in FIG. 5 and described more fully in British patent no. 1,449,455. This method comprises everting a lining tube (44) into ant along the interior of the passage (10) as shown, said lining tube comprising as shown in FIGS. 5A and 5B an inner tube (46) of a resin absorbent material, typically a felt, provided with an outer membrane or coating (48) of relatively impermeable material. As shown, as between FIGS. 5A and 5B, when the tube is manufactured, the felt layer (46) is to the inside and the coating (48) is to the outside, but after eversion takes place, as shown in FIG. 5, the felt (46) lies to the outside and adjacent to the passageway surface, whilst the coating or membrane (48) lies to the inside forming a smooth surface. The lining tube thus applied is held in position until the resin impregnating the felt cures, as a result of which a rigid, self-standing lining is provided on the passageway surface. This technique is well established and well known and further information is not given in relation thereto except to say that if the deposit (42) is such that it is detectable by light radiation energy, then the materials for the lining tube (44), the resin chosen and the radiation source, should all be selected to ensure that the radiation source can in fact shine through the lining tube when it is in position so that the deposit (42) which is sensitive to the light can be accurately sensed as to its position. In this connection reference might be made to European patent 0,155,406 which is concerned specifically with the use of materials for the lining to enable radiation light to be shone therethrough.

When the lining has been positioned, and is cured, a further apparatus, (50) is pulled into the lined sewer (10) as shown in FIG. 6, and the apparatus (50) is provided with an illuminating source (52) emiting a radiation to which the deposit (42) is sensitive and by which the deposit can be clearly seen as a glowing or fluorescent spot by an inspection camera carried by the apparatus (50). The camera is not shown. The apparatus (50) furthermore has a cutting head (54) having a cutting bit (56) in the form of a drill which can be extended to penetrate the lining and indeed to enter the lateral (12). The bit (56) is arranged to be provided at said predeterminded distance from the source (52), and at the angle (14) so that when the source (52) detects the deposit (42) as shown, the big (56) is in the correct positon for penetrating the lining and the lateral connection at the location previously engaged by the feeler (34). In other words, exact register of the position of the lateral is achieved without requiring any visual searching for dimples and without requiring any pre-recording of distances along the pipeline. When the apparatus (50) is accurately positioned, it is simply a matter of operating the cutting head (54) in known manner to perform a cutting operation. As soon as the drill (56) has accurately cut the first hole in the lining, and has entered the lateral, then cutting a circumferential slot in the lining to remove a coupon of lining material covering the lateral connection is simple and is performed to a well established practice.

Referring now to FIGS. 7–18, which show an alternative embodiment of the invention, referring to these drawings, the main pipeline or passageway is indicated by reference numeral (60), whilst the lateral is indicated by reference (61).

Figure 7:
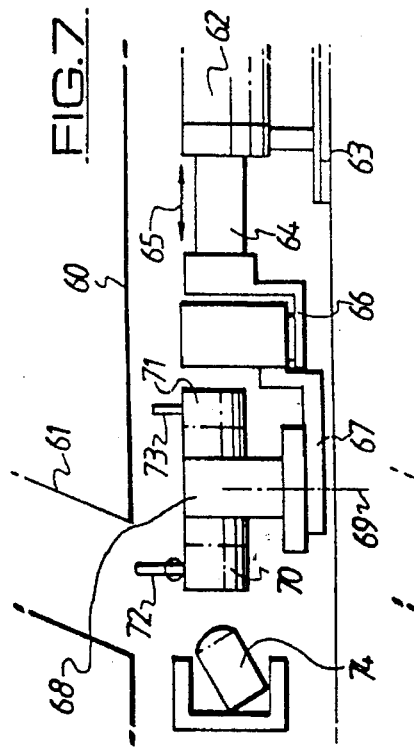

In FIG. 7, a positioning apparatus (62) is shown as being in the main pipeline or passageway (60), and it is provided with skids (63) by which it rests upon and may be jacked to the lower surface of the pipeline or passageway (62). A piston rod (64) extends from the main housing of the device, and is capable of being moved back and forth as indicated by arrow (65) under remote control from ground level. The end of rod (64) is provided with a mounting plate (66) which in turn carries a bracket (67) on which is rotatably mounted the head (68) by which the positioning of the radiation-sensitive means is achieved.

Head (68) is rotatable again under remote control about an axis (69), and head (68) has 2 wings (70) and (71) which respectively carry a drill bit (72) and a positioning arm (73). The positioning arm is adapted to carry a metallic element in the form of a steel ball which can be placed into a bore created by the drill bit (72) in the manner to be hereinafter described.

The wing (70) is provided with a drive motor for rotating the drill bit (72), whilst wing (71) is provided with a piston (not shown) whereby the positioning arm (73) can be extended and can be caused to deposit a steel ball at the end of the arm (73) in a bor formed in the surface of the pipeline or passageway.

FIG. 7 also shows that an inspection and viewing camera (74) is located inside the main pipeline or passageway (60) by which the manipulating operation to be described hereinafter can be carried out.

All of the functions of the apparatus illustrated can be controlled remotely by an operator at ground level, and an appropriate umbilical cord or cords connect the apparatus with the operation centre at ground level.

To perform the operation the sequence as illustrated in FIGS. 7–18 is performed.

Considering firstly FIG. 7 which indicates the commencement of the location stage, it is to be noted that the positioning arm (73) is retracted, and the drill bit (72) is in registry with the middle of the lateral (61).

Figure 8:
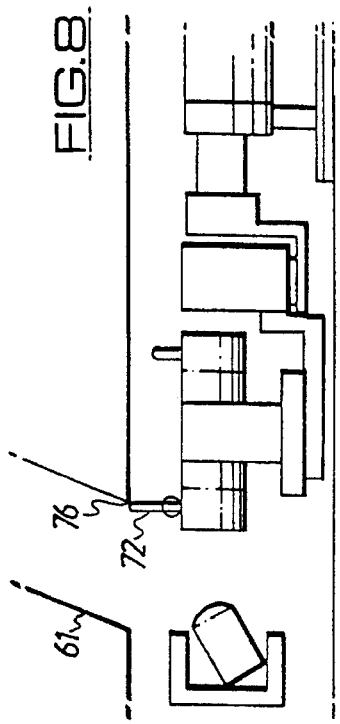

The entire apparatus is now moved to the right from the position shown in FIG. 7 until the position shown in FIG. 8 is reached in which condition, the drill bit (72) is in register with the edge (76) of the lateral (61). The apparatus is now in the desired position for the deposition of the steel ball.

Figure 9:
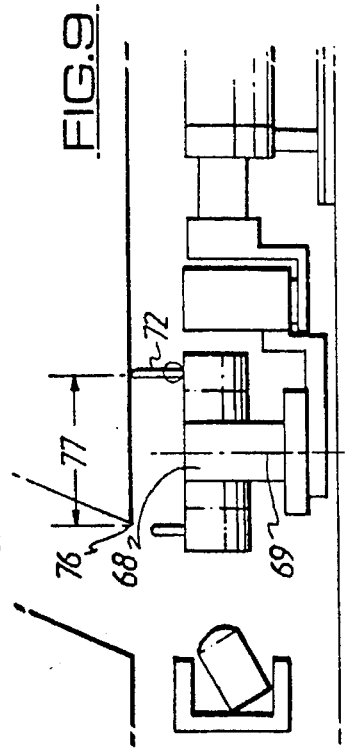

The apparatus is now moved to the drilling mode as shown in FIG. 9 in which the head (68) has been rotated through 180 degrees so as to bring the drill bit (72) into the position shown spaced at a pre-determined distance (77) along the main pipeline or passageway from the lateral edge (76).

Figure 10:
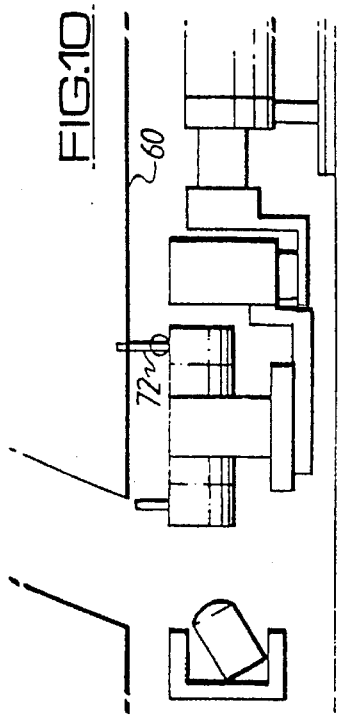

The drill is now operated and advanced as shown in FIG. 10 so as to penetrate the surface of the main pipeline or passageway (60).

Figure 12:
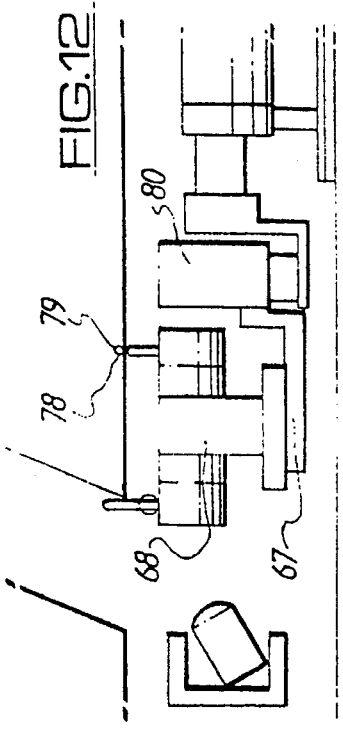
Figure 11:
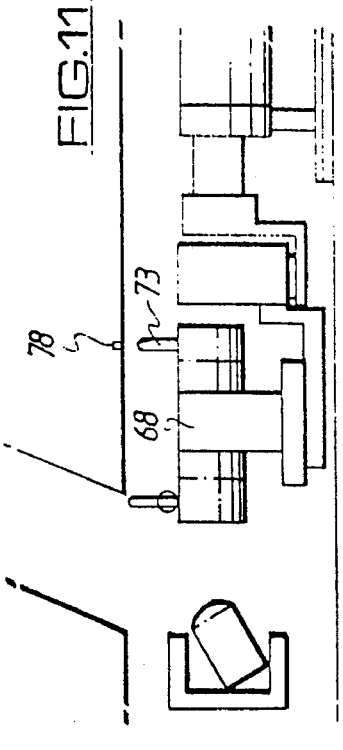

The drill is then retracted leaving the small recess (78) for the receipt of the steel ball which results from the positioning as illustrated in FIGS. 11 and 12.

In the FIG. 11 position, the head (68) has been rotated back to the FIG. 9 position, and the positioning arm (73) is now positioned in exact register with the recess (78) because the drill (72) and the positioning arm (73) are disposed radially at equal distances form the axis (69), and are also located at diametrically opposite locations.

The steel ball positioned on the end of the arm (73) and indicated by reference (79) in FIG. 12 is now positioned in the recess (78) by raising the bracket (67) by means of a lifting cylinder (80) which is part of the apparatus. The head (68) is subsequently lowered completing the placement operation.

The apparatus is now removed, and the main pipeline or passageway (60) subsequently is lined, for example as shown in FIG. 5, and FIGS. 13–18 illustrate the main pipeline or passageway and lateral after the lining operation has been completed. The lining is illustrated by the hatched areas and by the reference numeral (81).

In FIG. 13 it will be seen that the lining (81) extends over the lateral connection with the main pipeline or passageway, and the lining must be cut in this region in order to re-establish the connection.

This is done by re-introduction of the apparatus of FIG. 7 but suitably modified by the removal of wing (71), and by placement of a suitable detector (82) on the apparatus, which detector is a radiation detector and can readily locate the steel ball (79) which as will be appreciated has been covered by the lining (81). As the distance (77) (FIG. 9) is accurately known, the detector (82) can be positioned accurately in relation to the drill bit (72), and it is arranged so that when the apparatus is in a position shown in FIG. 13, and the detector (82) detects the steel ball (79) immediately there above, the drill (72) is in the correct position for drilling the lining at the lateral edge (76). The apparatus is operated as shown in FIG. 14 to cause the drill (72) to penetrate the lining (81) as shown. This is done by raising the jack device (80) previously described. After the first apperture has been cut in this fashion, the apparatus is lowered as shown in FIG. 15, and the head is advanced using the advancing ram (64) to a position shown in FIG. 15. In this position the head (68) has been rotated by 180 degrees so that the drill bit (72) again is coincident with the first hole which has been drilled in the lining as described in relation to (14). It is now simply a matter of raising the apparatus using ram (80) to the position shown in FIG. 16 when the drill bit (72) again enters the previously bored hole in the lining, and the head (68) is then rotated about its axis (69) thereby to cut a coupon from the lining (81) as shown in FIG. 16 to re-establish the lateral connection.

FIG. 17 and 18 are included to show that a lining apparatus (82) may be connected to the bracket (67) and be positioned thereby so as to insert a lining tube (83) into the lateral pipe (61), for example as described in our co-pending patent application no. PCT/GB91/00628 or U.S. patent application No. 533,866.

It will be appreciated that an extremely effective and efficient means of lateral positon location is provided. It should be noted that any or various radiation sensitive material may be employed in this invention. The deposit which is placed upon the pipeline or passageway surface may be such as to emit a signal which is detectable, or as in the case of the steel ball, it is an object which can be readily identified as to position.

For the cutting operation, the cutter may be angled as described in relation to FIGS. 1–6 in the embodiment of FIGS. 7–18 and indeed any appropriate feature may be taken from any of the embodiments and used with the other embodiments.

Modifications of the invention may be made. Thus, the deposit (42) may be magnetically or electrically detectable, in which case the lining need not have the necessary optical characteristics as may be required as in the case where the detection is done by light radiation energy. Additionally, as many spots as are required may be deposited on the passageway surface.

We claim:

1. A method of locating a lateral pipe which forms a connection with a main pipeline or passageway, wherein said main pipeline or passageway has been lined with a lining tube which extends over the connection of the lateral pipe and main pipeline or passageway, comprising depositing a radiation sensitive means on the main pipeline or passageway at a pre-determined distance from the edge of the lateral pipe prior to the lining operation, locating the edge of the lateral pipe and the main pipeline or passageway connection using a mechanical feeler to establish a datum, and positioning the radiation sensitive means at a pre-determined distance from the datum by a positioning member, inserting a locating means into the lined main pipeline or passageway after the main pipeline or passageway has been lined, said locating means having a sensor for sensing the location of the radiation sensitive means, and determining the location of the lateral pipe and the main pipeline or passageway connection from the location of the deposited radiation sensitive means.

2. A method according to claim 1, wherein the radiation sensitive means is light, magnetic, sonic or electric radiation sensitive.

3. A method according to claims 1 or 2, wherein the positioning means is a positioning arm.

4. A method according to claim 3, wherein the radiation sensitive means is a deposit of radiation sensitive fluent material.

5. A method according to claim 4, wherein the positioning arm has a deposit pad and is connected to the feeler by means of a lever arrangement so that when the feeler has detected the edge of the lateral connection, the lever arrangement is pivoted which causes the pad to be brought into deposit contact with the pipeline or passageway surface to make the deposit.

6. A method according to claims 1 or 2, wherein characterised in that the radiation sensitive means is an element of rigid, metallic form.

7. A method according to claim 6, characterised in that the element is placed in a hole drilled in the pipeline or passageway surface.

8. A method according to claim 7, wherein said feeler also comprises a drill bit and after the feeler has located the edge of the lateral connection, it is moved by said pre-determined distance and is used to drill said hole in the passageway surface.

9. A method according to claim 8, wherein a positioning arm arranged with said feeler on a rotary head, said head having an axis of rotation, at diametrically opposite positions equi-distant from the axis of rotation of the head, and the positioning arm inserts the element in said drilled hole after drilling of same and after rotating the head by 180 degrees.

10. A method according to claim 1, 2, 4, 5, 7, 8, or 9, including the step of lining the main pipeline or passageway with said lining tube.

11. A method according to claim 10, including the step of locating the lateral connection using a radiation sensor which senses the radiation sensitive means.

12. A method according to claim 11, including the step of cutting the lining tube to re-establish the connection of the lateral pipe to the main pipeline or passageway.

13. An apparatus for facilitating the location of a lateral pipe which forms a connection with a main pipeline or passageway said main pipeline having been lined during a lining operation with a lining tube which extends over the lateral pipe and main pipeline or passageway connection, comprising means for depositing a radiation sensitive means on the main pipeline or passageway, before the lining operation, at a predetermined distance from the lateral pipe and main pipeline or passageway connection, said depositing means including a mechanical feeler with means for engaging the edge of the lateral pipe and main pipeline or passageway connection such that when the feeler has engaged the edge, a pad which is located a predetermined distance from the feeler is caused to deposit the radiation sensitive means.

* * * * *